THIN FILM MAGNETIC TOROID

Filed June 23, 1966 3 Sheets-Sheet 1

INVENTOR
A. H. BOBECK
BY Herbert M. Shapiro
ATTORNEY

United States Patent Office 3,521,250
Patented July 21, 1970

3,521,250
THIN FILM MAGNETIC TOROID

Andrew H. Bobeck, Chatham, N.J., assignor to Bell Telephone Laboratories, Incorporated, Murray Hill, N.J., a corporation of New York Filed June 23, 1966, Ser. No. 559,776
Int. Cl. G11c 5/02, 11/06, 11/14
U.S. Cl. 340—174 9 Claims

ABSTRACT OF THE DISCLOSURE

An electrically conductive toroid encompassed by an anisotropic magnetic film provides flux closure paths in both hard and easy directions. The toroid is operated in a rotational mode in response to coincident pulses in an electrical conductor and a flux carrying rod.

This invention relates to magnetic memories and, more particularly, to such memories comprising thin magnetic films.

Thin film magnetic memories are characterized by losses due to the "open-flux" geometry of the magnetic elements thereof as is well known. Many attempts have been made, accordingly, to provide such elements with "closed" thin magnetic film structures. The advantages to such a closed structure, of course, are the economically lower drive requirements and reduced sensitivity to creep as is well known.

The effort to achieve an idealized closed thin magnetic film memory element is continuing because the resulting structures hitherto have failed to provide completely closed flux paths.

Accordingly, an object of this invention is to provide a new and novel closed thin film magnetic memory.

The term "closed" herein characterizes a thin magnetic film structure wherein flux is always rotated in a direction for which completely closed paths are provided.

The invention is based on the realization that a thin magnetic film formed into a toroidal core provides complete flux closure and that such a thin film core may be operated conveniently by a hybrid magnetic-conductive accessing arrangement. Accordingly, the foregoing and further objects of this invention are realized in one embodiment thereof wherein a thin anisotropic magnetic film is deposited to encompass the surface of an electrically conductive core and is accessed by a current in a selected coordinate conductor and by flux switched in an orthogonal magnetic wire. The current generates a circumferential hard direction field about the conductive core in the magnetic film there. Flux switched in a selected coordinate magnetic wire induces a voltage in the conductive core in the direction of the hard axis of the magnetic film. Consequently, a current flows through the conductive core, and that current is accompanied by a magnetic field in the easy direction radially about the (cross section of the) core in the magnetic thin film. Operation is in a rotational mode. A complete flux closure path is provided along both the easy and hard directions in the magnetic film.

Accordingly, a feature of this invention is a conductive core including an encompassing thin anisotropic magnetic film.

A further feature of this invention is an arrangement of conductive cores each encompassed by a thin magnetic film and accessed by orthogonal electric conductors and magnetic wires.

The foregoing and further objects and features of this invention will be understood more fully from the following detailed discussion rendered in conjunction with the accompanying drawing wherein.

Figure 1:
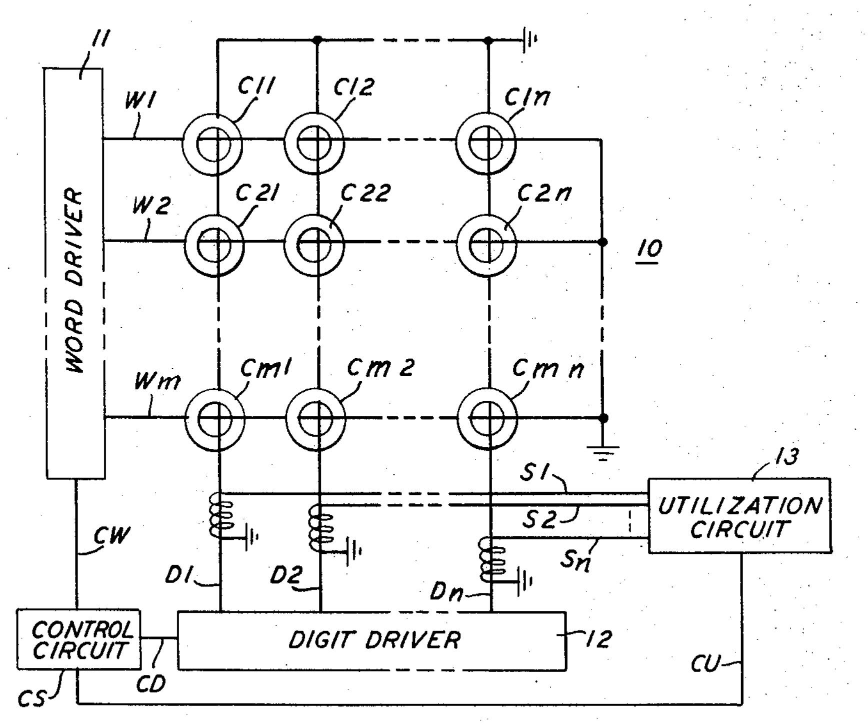
FIG. 1 is a schematic representation of a magnetic memory in accordance with this invention.

Specifically, FIG. 1 shows an illustrative word-organized memory 10 in accordance with this invention. The memory comprises a matrix of core elements *Cij* where *i* corresponds to the row and *j* to the column in which the core is positioned. The cores are threaded by word and digit drive lines designated W1 . . . W*m* and D1 . . . D*n*, respectively. The word lines are connected between a word driver 11 and ground. Similarly, the digit lines are connected between a digit driver 12 and ground. Corresponding sense conductors S1, S2, . . . S*n*, coupled to digit lines D1, D2, . . . D*n*, respectively, are connected between a utilization circuit 13 and ground. Drivers 11 and 12 and utilization circuit 13 are connected to a control circuit CS via conductors CW, CD, and CU, respectively.

Figure 2:
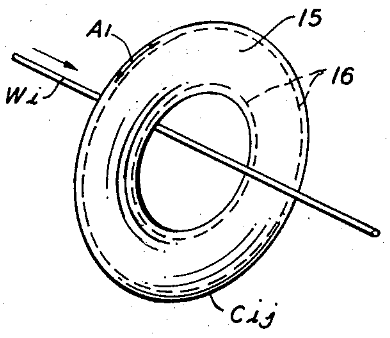
FIGS. 2 and 3 are schematic representations of portions of the memory of FIG. 1 illustrating flux conditions therein during operation.

A representative core element C*ij*, in accordance with this invention, is shown in FIG. 2. The element comprises a conductive core 15 with an anisotropic magnetic film 16 encompassing that core. The conductive core 15 is illustratively copper and the film 16 is conveniently a Permalloy film. Such a structure is provided by known plating techniques or, alternatively, by selective evaporation techniques wherein magnetic, copper, and magnetic films are deposited in succession on a suitable support as is described further hereinafter. Illustratively, film 16 has a circumferential hard direction axis as indicated by the double-headed arrow A1 shown in FIG. 2. The easy axis is radially oriented as shown by the double-headed arrow A2 in FIG. 3. Such axes may be provided under the influence of magnetic fields during the deposition of the magnetic film as is well known.

In accordance with this invention, a core element C*ij* is operated in the rotational mode conveniently by a hybrid drive. Specifically, flux in the film 16 of core C*ij* is tipped to a stable magnetic condition in first and second directions along the easy axis indicated by arrow A2 in FIG. 3 in response to flux switched in a magnetic digit line. To this end, a digit line D*j* of FIG. 3, in accordance with this invention, comprises a magnetic wire in which flux may be switched in first and second directions. If flux in wire D*j* is switched from a downward direction to an upward direction indicated by the arrow A3 in FIG. 3 an electric field is generated thereabout. In response, a counterclockwise current is generated in the copper core 15 of element C*ij* as viewed in FIG. 3. That current generates a clockwise radial (about the cross section as viewed in FIG. 3) magnetic tipping field as indicated by the arrow A2.

A positive word current applied to a word conductor W1 also coupled to core C*ij* drives flux in film 16 thereabout counterclockwise along the hard direction inducing only negligible eddy currents in the conductive core 15 there. The aforementioned tipping field is applied as the word current is terminated. In response, flux in film 16 is tipped to the first (counterclockwise) direction along the easy axis. If flux is switched from the upward to the downward condition in digit line D*j* as the word current terminates, flux in element C*ij* rotates to a second (clockwise) direction along the easy axis.

The first and second directions along the easy axis of the film 16 of core C*ij* may be taken as representing a binary one and a binary zero respectively. Thus a binary word, say 10 . . . 1, is written into the elements of the first row of FIG. 1 by applying a positive word current to word conductor W1 and by switching flux upward, downward, . . . , and upward in the magnetic digit lines D1, D2, . . . , and D*n* as that word current terminates. The word and digit lines are pulsed by means of word and digit drivers 11 and 12, respectively, under the control of control circuit CS. To this end, the digit lines may be of a magnetic material such as nickel-zinc-ferrite having linear characteristics.

For a read operation, a positive current is applied to conductor W1. Such a current pulse generates a magnetic field driving flux to a counterclockwise direction along the hard axis in the films 16 of the cores C*ij* coupled thereby as has already been described. When flux rotates to the counterclockwise hard direction, current flows in indicative directions in the corresponding conductive cores switching flux in the corresponding digit lines to first and second directions according to the information stored. The switching of flux in the digit lines is detected by utilization circuit 13 conveniently in parallel under the control of control circuit CS.

The orientations of the easy or hard axes, of course, may be reversed if the "word" lines are magnetically conductive and the digit lines are electrically conductive.

The various drivers, circuits, et ectera described herein may be any such elements capable of operating in accordance with this invention.

Memories of the type described may be operated at speeds of about one microsecond with word pulses of 200 milliamperes and digit pulses of 0.6 millivolt-microsecond.

Figure 4:
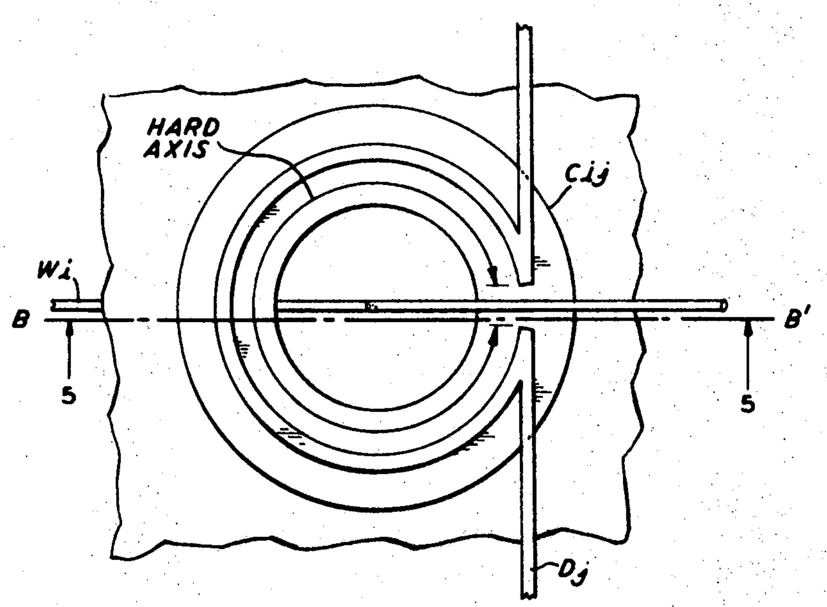
FIGS. 4 and 5 are schematic representations of portions of another magnetic memory arrangement in accordance with this invention.

The invention has been described in terms of a hybrid drive arrangement. It is clear that a hybrid drive is not necessary, however. For example, FIG. 4 shows an arrangement where the digit line is electrically conductive rather than magnetically conductive as indicated in connection with the embodiment of FIG. 1.

Figure 3:
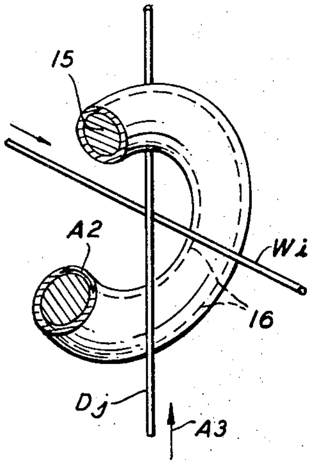
Figure 5:
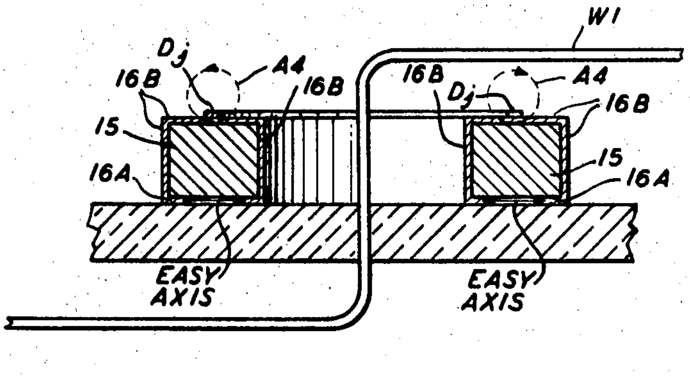

A representative core in such an arrangement is formed by deposition techniques on an inert substrate such as glass as depicted in FIG. 5. FIG. 5 shows a cross section of the element C*ij* of FIG. 4 taken along the broken line B–B′ there. Specifically, a (10,000 angstrom unit) layer of Permalloy 16A followed by a (40,000 angstrom unit) copper layer 15 and a final (10,000 angstrom unit) Permalloy layer 16B form a deposited electrically conductive core 15 and an encompassing film 16 as shown in FIGS. 2 and 3. The film 16 includes a circumferential hard axis and a radial easy axis also as described hereinbefore in connection with FIGS. 2 and 3. Operation is entirely analogous to that described in connection with the embodiment of FIG. 1, a current in first and second directions in selected digit lines generating a toroidal magnetic field which in turn induces the requisite current in corresponding conductive cores (shorted turn) as described. To this end, the digit line D*j*, in the embodiment of FIG. 4, overlies each core coupled thereby as shown in FIG. 5 in a manner to generate a toroidal magnetic field, when pulsed, thus generating the tipping currents in corresponding conductive cores 15. The currents in conductive cores 15, in turn, generate easy direction fields as described hereinbefore, those fields being effective only in the cores coupled by the selected word line as is well known.

The toroidal field generated directly by the current in a digit line is represented by the broken arrows A4 shown in FIG. 5. Such a field creates an ideally negligible imbalance in the magnetic film 16. That imbalance is minimized by dimensioning the magnetic film to provide maximized demagnetization fields for a radial flux imbalance. A magnetic film thickness of 10,000 angstrom units is quite sufficient to this end. Alternatively, symmetrical digit lines may be employed one above and one (not shown) below the thin film core, as viewed in FIG. 5, to generate the requisite field about conductive core 15 in a balanced manner to influence little the magnetization in the thin film 16. As was the case with the embodiment of FIG. 1, the easy and hard axes as shown in FIGS. 4 and 5 can be interchanged if the word conductor W1 takes the shape of the digit condutcor D*j* as shown in FIG. 5 and vice versa.

Figure 6:
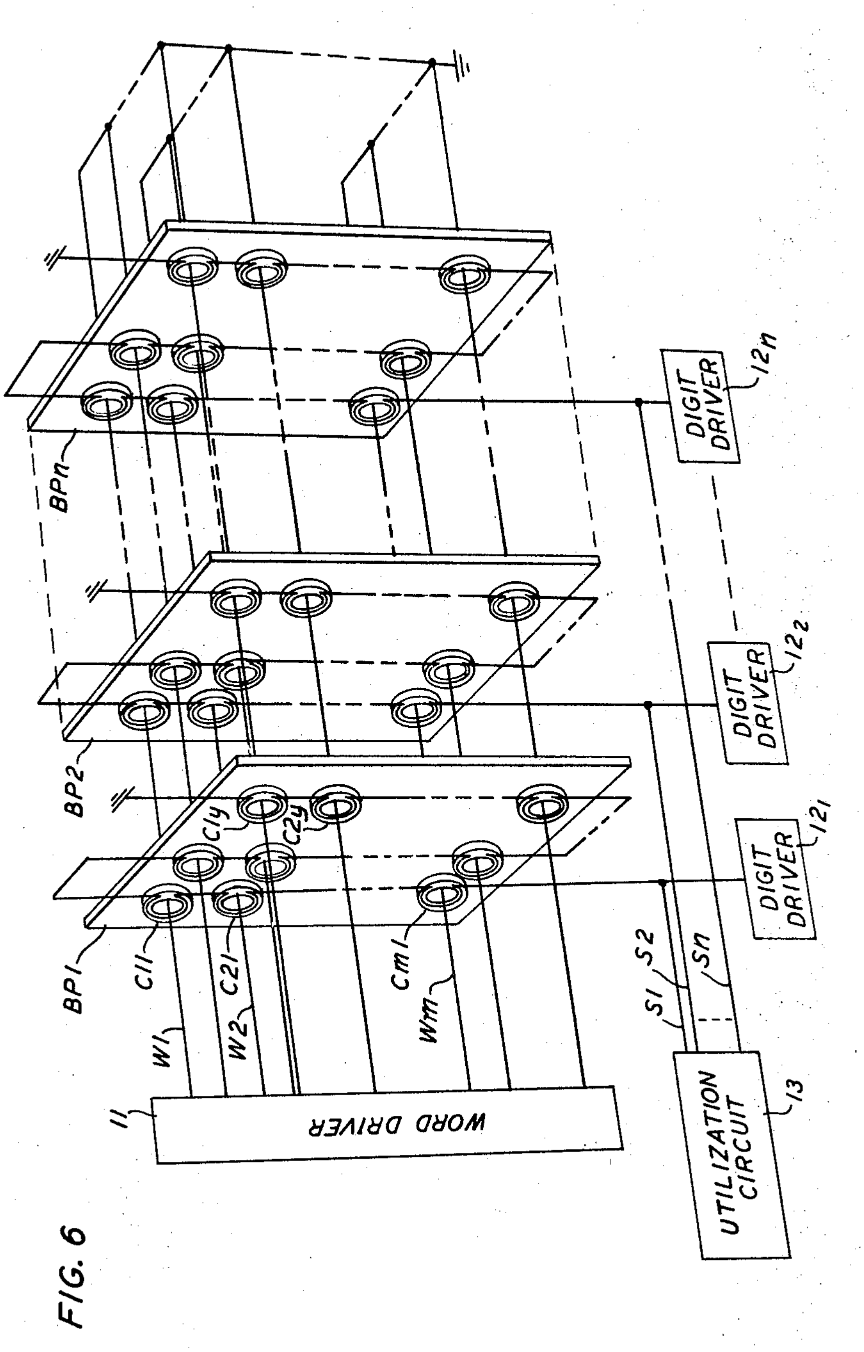
FIG. 6 is a schematic representation of a three-dimensional arrangement of a magnetic memory in accordance with this invention.

FIG. 6 shows a three-dimensional memory array in accordance with this invention showing the simple threading arrangement for word lines. The array is arranged as a sequence of *n* bit planes BP1 . . . BP*n*. Corresponding cores C*ij* on each bit plane are coupled by a single word line. For example, word line W11 couples core C11 on each of bit planes BP1 . . . BP*n* and is connected between word driver 11 and ground. The designations of the various elements herein correspond to those shown in FIG. 1 to facilitate comparison between FIGS. 6 and 1. Note that the word 10 . . . 1 mentioned above is stored along a word line. All the cores C11 . . . C*my* of each bit plane are coupled by a single digit line connected between a corresponding digit driver $\mathbf{12_1}$, $\mathbf{12_2}$, . . . $\mathbf{12_n}$ and ground. Note the digit driver is shown as a single block in FIG. 1. Sense lines S1 . . . S*n* are connected between corresponding digit lines and utilization circuit 13. It is to be appreciated that the representation as shown in FIG. 1 then would correspond to a column of bits in each of bit planes BP1, BP2, . . . BP*n* and operation is entirely analogous to that described in connection with FIG. 1.

The array of FIG. 6 illustratively comprises elements as shown in FIG. 4 therein. It is to be understood that the elements discussed in connection with FIGS. 2 and 3 may be substituted therefor however. The various drive implementations compatible with the elements discussed in connection with FIGS. 2 and 3 are also suitable in the arrangement of FIG. 6. The utilization circuit for conductive and magnetic digit drive may be any circuit adapted to operate in accordance with this invention.

It is clear from the double-headed arrows in FIGS. 2, 3, 4, and 5 that completely closed flux paths are available along both the hard and easy axes for the cores of each of the embodiments described.

It is to be understood that what has been described is merely illustrative of this invention and that numerous other arrangements in accordance with the principles of this invention may be devised by one skilled in the art without departing from the spirit and scope thereof.

What is claimed is:

1. In combination, an electrically conductive toroid free of electrical connections thereto and an anisotropic thin magnetic film encompassing said toroid, said film having hard and easy axes.

2. A combination in accordance with claim 1 wherein said anisotropic film has a circumferential hard axis.

3. A combination in accordance with claim 1 wherein said anisotropic film has a radial hard axis.

4. A combination in accordance with claim 1 including first means driving flux in said film to a direction along said hard axis, and second means selectively tipping flux to first and second directions along said easy axis.

5. A combination in accordance with claim 4 wherein said second means comprises a magnetic medium, and means for selectively driving flux in first and second directions in said medium for inducing currents in first and second directions in said conductive toroid.

6. A combination in accordance with claim 4 wherein said second means comprises an electrical conductor overlying said core and shaped to generate a field for inducing a current in said conductive toroid when pulsed, said current inducing a tipping field in a direction along said easy axis.

7. A magnetic memory comprising a plurality of electrically conductive cores free of electrical connections thereto, each of said cores being encompassed by an anisotropic thin magnetic film having hard and easy axes.

8. A magnetic memory in accordance with claim 7 including first means driving flux in the films encompassing selected cores in a direction along said hard axis, and second means selectively tipping flux in the films of those selected cores to first and second directions along said easy axis.

9. A magnetic memory including a plurality of bit planes, each of said bit planes including an array of electrically conductive cores, each of said cores being free of electrical connections thereto and being encompassed by an anisotropic thin magnetic film having hard and easy axes, first select means including a plurality of drive lines each coupled to the thin film of the corresponding core in each of said bit planes for driving along hard axes flux in the thin films coupled thereby when selected, second select means including a plurality of drive lines each adapted for selectively inducing a current in first and second directions in each of the conductive cores in a bit plane, said currents generating first and second tipping fields, respectively, in the corresponding thin films coupled thereby tipping flux to first and second directions only along the easy axis of each core selected by said first select means, and means for sensing the direction of flux along said easy axis.

References Cited

UNITED STATES PATENTS

| | | | |
|---|---|---|---|
| 3,371,327 | 2/1968 | Anderson et al. | 340—174 |
| 3,223,986 | 12/1965 | Clark | 340—174 |

OTHER REFERENCES

Publication I, IBM Tech. Discl. Bulletin, vol. 8, No. 11, April 1966, pp. 1609–1610.

JAMES W. MOFFITT, Primary Examiner